US008925813B2

(12) United States Patent
Ahmed et al.

(10) Patent No.: US 8,925,813 B2
(45) Date of Patent: Jan. 6, 2015

(54) LABELING FOR AUTOMATIC MAIL SORTING SYSTEM

(71) Applicants: Asif Bilal Ahmed, Irving, TX (US); Hongjian Li, Coppell, TX (US); Peter Parker, Keller, TX (US)

(72) Inventors: Asif Bilal Ahmed, Irving, TX (US); Hongjian Li, Coppell, TX (US); Peter Parker, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/892,647

(22) Filed: May 13, 2013

(65) Prior Publication Data

US 2013/0299578 A1 Nov. 14, 2013

Related U.S. Application Data

(60) Provisional application No. 61/645,729, filed on May 11, 2012, provisional application No. 61/645,719, filed on May 11, 2012.

(51) Int. Cl.

| | |
|---|---|
| *G06K 7/00* | (2006.01) |
| *B07C 5/34* | (2006.01) |
| *B07C 7/00* | (2006.01) |
| *B07C 3/14* | (2006.01) |

(52) U.S. Cl.
CPC ............... *B07C 5/3412* (2013.01); *B07C 7/005* (2013.01); *B07C 3/14* (2013.01)
USPC ........... 235/385; 235/375; 235/435; 235/439; 235/454; 235/462.01

(58) Field of Classification Search
USPC .................. 235/375, 385, 435, 439, 454, 462
See application file for complete search history.

(56) References Cited

U.S. PATENT DOCUMENTS

2005/0189409 A1* 9/2005 Conard et al. ................ 235/375
2006/0043183 A1* 3/2006 Nihommatsu ................ 235/454

* cited by examiner

*Primary Examiner* — Matthew Mikels

(57) ABSTRACT

A method for automatically sorting undeliverable as addressed (UAA) mail includes capturing an image of a first UAA mail piece with a camera connected to an automated mail sorter to create first image data, printing an id-tag on the mail piece, and classifying the first UAA mail piece as one of finalized or non-finalized. The method includes outputting a first label result to a label printer and printing a new label on the first UAA mail piece if the first UAA mail piece is classified as finalized.

20 Claims, 5 Drawing Sheets

100

200

300

LABELING FOR AUTOMATIC MAIL SORTING SYSTEM

CROSS-REFERENCE TO RELATED APPLICATION

This application claims the benefit of the filing date of U.S. Provisional Patent Application 61/645,729, filed May 11, 2012, which is hereby incorporated by reference. This application also claims the benefit of the filing date of U.S. Provisional Patent Application 61/645,719, filed May 11, 2012, which is hereby incorporated by reference. This Application shares some common subject matter with commonly assigned, concurrently filed U.S. patent application Ser. No. 13/892,679 to Li et al., titled, "Automated Waste Mail Verification", which is hereby incorporated by reference.

TECHNICAL FIELD

The present disclosure is directed, in general, to automated mail sorting equipment.

BACKGROUND OF THE DISCLOSURE

Mail delivery is an important function and adds value to the economy far exceeding its cost. The United States Postal Service delivers billions of pieces of mail each year. The systems in place have a long history. New layers of processes are added over previous layers, in an attempt to optimize the overall delivery of mail pieces. The reasoning behind the existing systems is not always transparent. Many competing and conflicting considerations may have been built into the current processes.

SUMMARY OF THE DISCLOSURE

Embodiments disclosed herein relate to a method for automatically sorting undeliverable as addressed (UAA) mail, which includes capturing an image of a first UAA mail piece with a camera connected to an automated mail sorter to create first image data, printing an id-tag on the mail piece, and classifying the first UAA mail piece as one of finalized and non-finalized. The method includes outputting a first label result to a label printer and printing a new label on the first UAA mail piece if the first UAA mail piece is classified as finalized.

Embodiments disclosed herein also relate to an automated mail sorter for automatically sorting UAA mail, the mail sorter configured to capture an image of a first UAA mail piece with a camera connected to the automated mail sorter to create first image data, classify the first UAA mail piece as one of finalized and non-finalized. The automated mail sorter is configured to output a first label result to a label printer and print a new label on the first UAA mail piece if the first UAA mail piece is classified as finalized.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The United States Postal Service (USPS) processes its Undeliverable As Addressed mail on a system called PARS (Postal Address Redirection System). Much of the UAA mail requires human intervention to process, and this takes time. The PARS system scans UAA mail in the first run, then stages (or temporarily stores) the mail while redirect information is retrieved, and then labels it in the second run. While certain embodiments are discussed below in the context of a PARS system, the appended claims are intended to apply to any system that operates or is structured as claimed.

Mail that cannot be delivered to an address on the mail piece may be called UAA mail. There may be several reasons for this condition. The person may have moved from the address, the address may not exist anymore, or the address may name the wrong person. UAA mail processing can be very expensive. The USPS may have an annual volume of over 4 billion UAA mail pieces (approximately 2-3% of total mail volume). PARS automates this process to reduce the cost of processing UAA mail pieces. UAA mail can be classified into three main types, depending on origin.

Intercept (INT) is UAA mail that can be identified as UAA automatically by the PARS system before the mail-carrier tries to deliver it. These mail pieces are separated, and are redirected to the final destination by the PARS system in the first run. This type of UAA mail can account for approximately 40% of the UAA volume.

Carrier Identified Forward (CIF) is UAA mail that the mail-carrier (postman) tries to deliver, but identifies it as mail that needs to be forwarded to a new address. This type of UAA mail can account for approximately 20% of UAA volume.

Return To Sender (RTS) is mail that the mail-carrier (postman) tries to deliver, but wants it returned to the sender due to various postal rules. RTS mail can account for approximately 40% of the UAA volume. All of these different types of UAA mail can be processed using methods that can require two runs or passes through an automated sorting machine.

Figure 1:
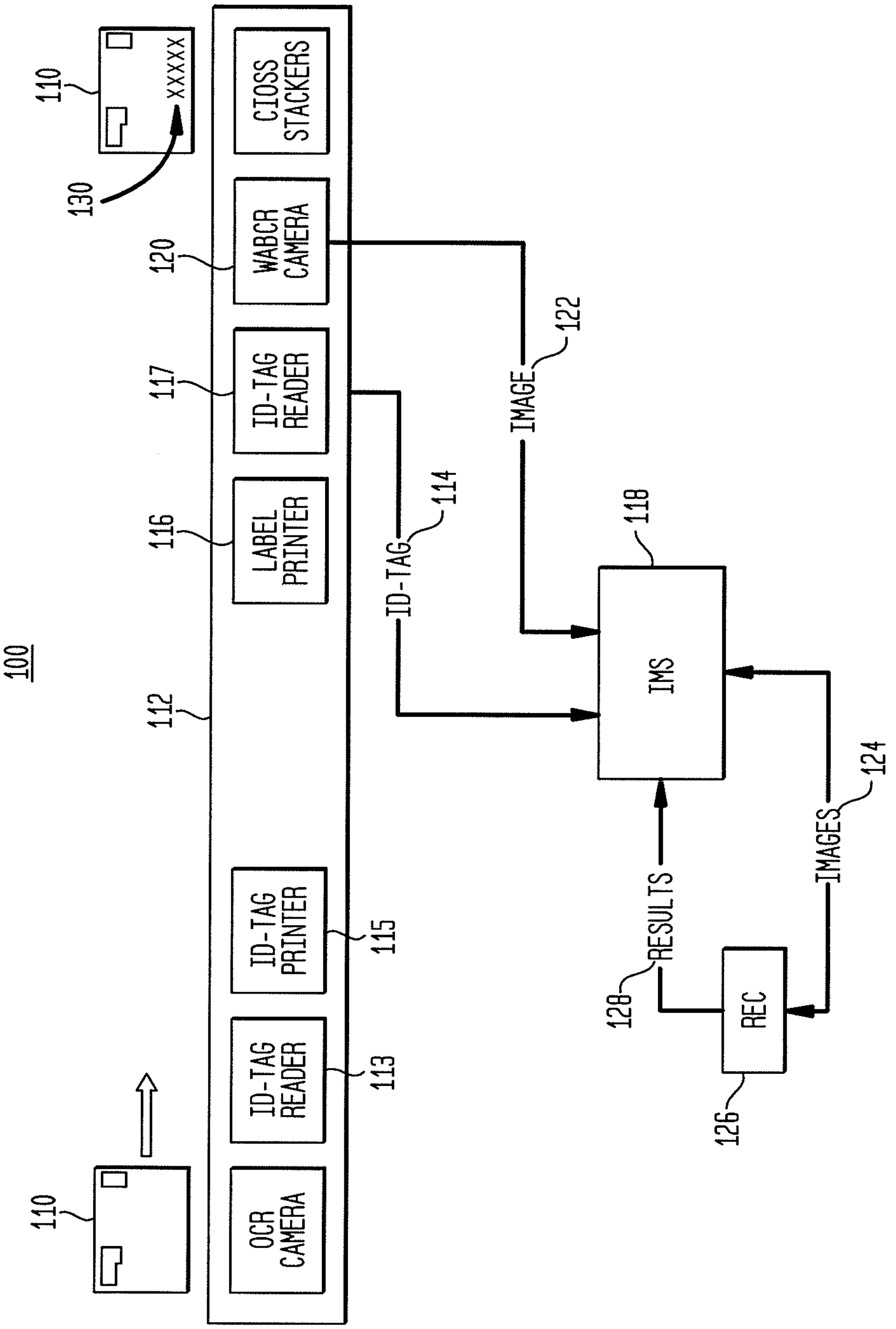
FIG. 1 depicts an automatic mail sorting machine configured in a lift-mode in accordance with disclosed embodiments.

FIG. 1 depicts an automatic mail sorting machine configured in a lift-mode in accordance with disclosed embodiments. Referring to FIG. 1, a CIOSS (Combined Input/Output Subsystem) transport 100 is shown. Transport 100 can include mail handling and routing hardware, and one or more associated controllers, to control and coordinate various components and route mail piece 110. A first run can route a UAA mail piece 110 along a mail transport path 112, and if the mail piece does not already have an ID-tag 130 as read by the Primary ID-tag reader 113, it will print an ID-tag 130 on each mail piece with the ID-tag printer 115. The ID-tag 130 can be a fluorescent bar code printed by ID-tag printer 115 on the back of the mail piece. The ID-tag 130 is meant to easily identify the mail piece 110 during later processing. The CIOSS transport 100 will receive the image from the WABCR camera 120 and combine this with the ID-tag read 114 from the ID-tag reader 117. WABCR camera is a Wide Area Bar Code Reader which may be any type of imaging bar code reader configured to capture an image of at least the relevant portions of the mail piece 110. In some embodiments, the WABCR camera 120 may be a high resolution imaging device arranged to capture an image of the entire outside surface of the largest mail piece 110 that the transport 100 can carry.

The combined data from the WABCR camera 120 and ID-tag reader 117 is then sent to the Image Management System 118 (IMS). The IMS 118 can use OCR (Optical Character Recognition) technology to read the information contained in the image 122 on each mail piece 110. Unreadable images 124 of mail pieces 110 can be sent to the REC 126 (Remote Encoding System) where human keyers can look at an image 124 of the mail piece 110 and type the information on a computer system. The human keyers can introduce a significant delay into the process. Based on this information and mail-processing rules, the mail piece can be finalized into one of four categories, including i) forwarded to a new address; ii) returned to the sender; iii) wasted; or iv) sent for manual handling or rejected. Results 128 can be forwarded to the IMS 118.

The first run can be called the 'Lift' run because the image 122 of the mail piece can be 'lifted' in this run. The 'Lift' run can be executed on an automated mail sorting machine such as a CIOSS or a DIOSS (Delivery Bar Code Sorter with Input/Output Subsystem) transport, or other system.

This finalization process can require substantial time and delay due to human intervention (keying). Label printer 116 is not used in the first run because all of the data is not ready to be printed by the label printer 116 until the keyers have finished their work. The mail can be staged (in other words, stored, stacked or otherwise held) for a period of time. When enough time has passed, the mail can then re-run or passed through the automated sorting machine 200 for a second time in the 'Label' mode, as shown in FIG. 2.

Figure 2:
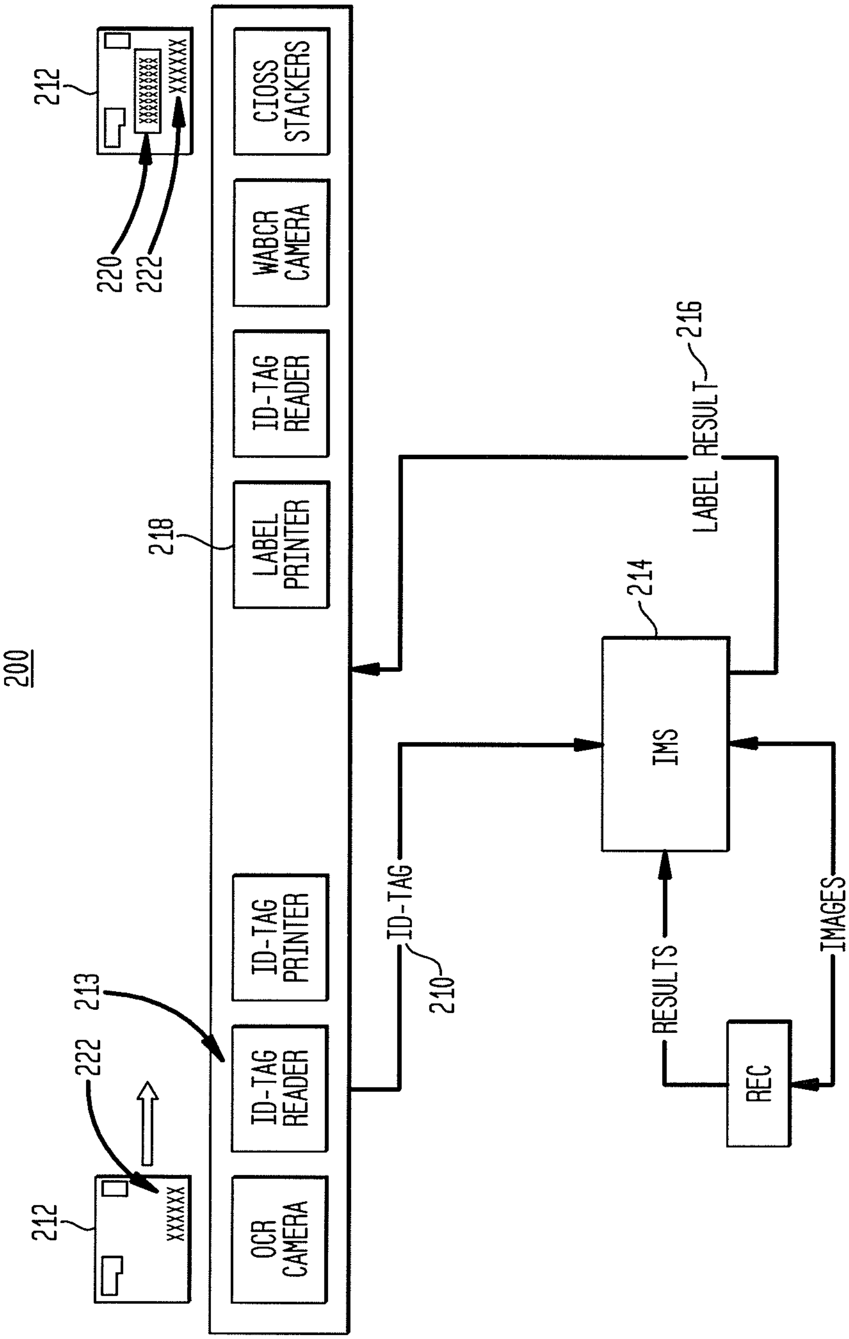
FIG. 2 depicts an automatic mail sorting machine configured in a label mode in accordance with disclosed embodiments.

FIG. 2 depicts an automatic mail sorting machine configured in a label mode in accordance with disclosed embodiments. Referring to FIG. 2, in the 'Label' mode (i.e. the second run), the CIOSS 200 transport can be configured to read the ID-tag 222 of the mail piece 212 using the Primary ID-tag reader 213 and query IMS 214 with ID-tag data 210. IMS 214 can return the answer or label result 216 for the mail piece 212 and based on the resolution, the mail piece 212 can get a yellow label 220 from label printer 218 with a new address, return address, or other information on it. In some cases no label is printed on the mail piece 212 and it is sent for manual handling. This can be done on a CIOSS transport 200, which has a labeler and a printer to affix and print the PARS label.

Figure 3:
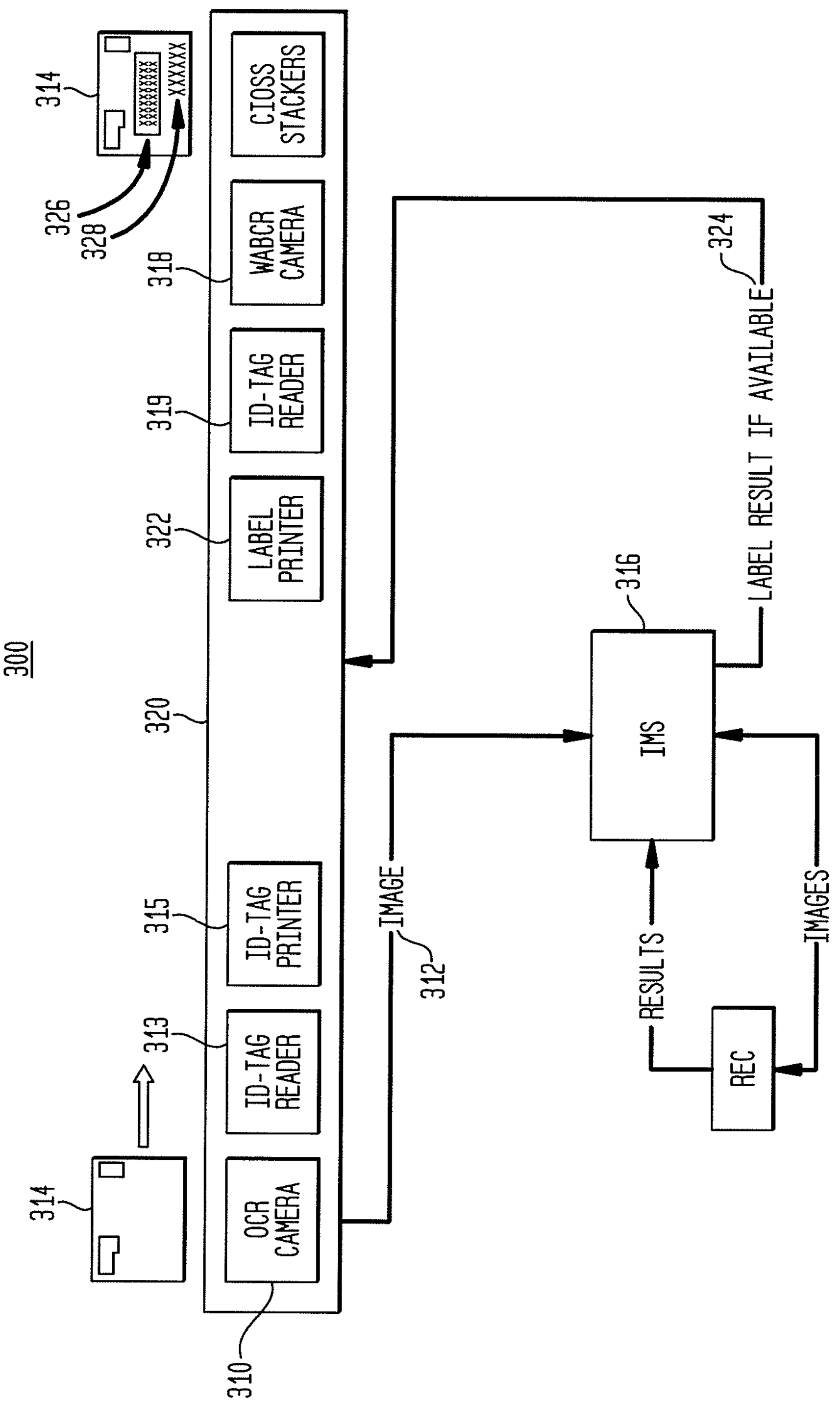
FIG. 3 depicts an automatic mail sorting machine configured in an on-line label mode in accordance with disclosed embodiments.

FIG. 3 depicts an automatic mail sorting machine configured in an on-line label mode in accordance with disclosed embodiments. Referring to FIG. 3, by changing the process and modifying the architecture of the transport 320 and IMS 316, the two run process described above can be combined into a single process for most mail pieces. In other words, a new mode on the CIOSS can combine the two operations into one. In this mode, the CIOSS transport architecture 320 can use the OCR Camera 310 to capture and send an image 312 of mail piece 314 to IMS 316. Here, the WABCR camera 318, which may be necessary in other modes (e.g., non-UAA runs) at a position near the end of the transport 320, is not used to capture data from the mail piece 314. This will enable the OCRs on IMS 316 to resolve the mail piece 314 and determine its final disposition before the mail piece 314 reaches the label printer 322. Most label results 324 will be available by the time the mail piece 314 reaches the label printer 322. When the label result 324 is ready for a particular mail piece 314, label printer 322 prints a yellow label 326 on mail piece 314. Some pieces 314 that require keying will not be finalized in the first run; these mail pieces 314 will be sorted separately. These mail pieces 314 will be staged for some time and re-run in a label-mode as described with respect to FIG. 2 above.

Mail pieces 314 which cannot be finalized require that an ID-tag 328 be printed on the mail piece 314 to later identify the mail piece 314 and match it with the finalization results. The ID-tag 328 can be a phosphorescent bar code printed on the reverse side of the mail piece 314. Alternatively, the ID-tag 328 can be another type of machine readable code printed on the mail piece 314. The ID-tag 328 can be printed by the ID-tag printer 315, or by another specialized printer at a different location on transport 320. ID-tag 328 may be read by either primary ID-tag reader 313 on a subsequent run, or by secondary ID-tag reader 319. Depending on the location of the ID-tag printer 315, the ID-tag 328 can be printed on every mail piece 314, if a finalization result is not known before the mail piece 314 reaches the ID-tag printer 315.

Figure 4A:
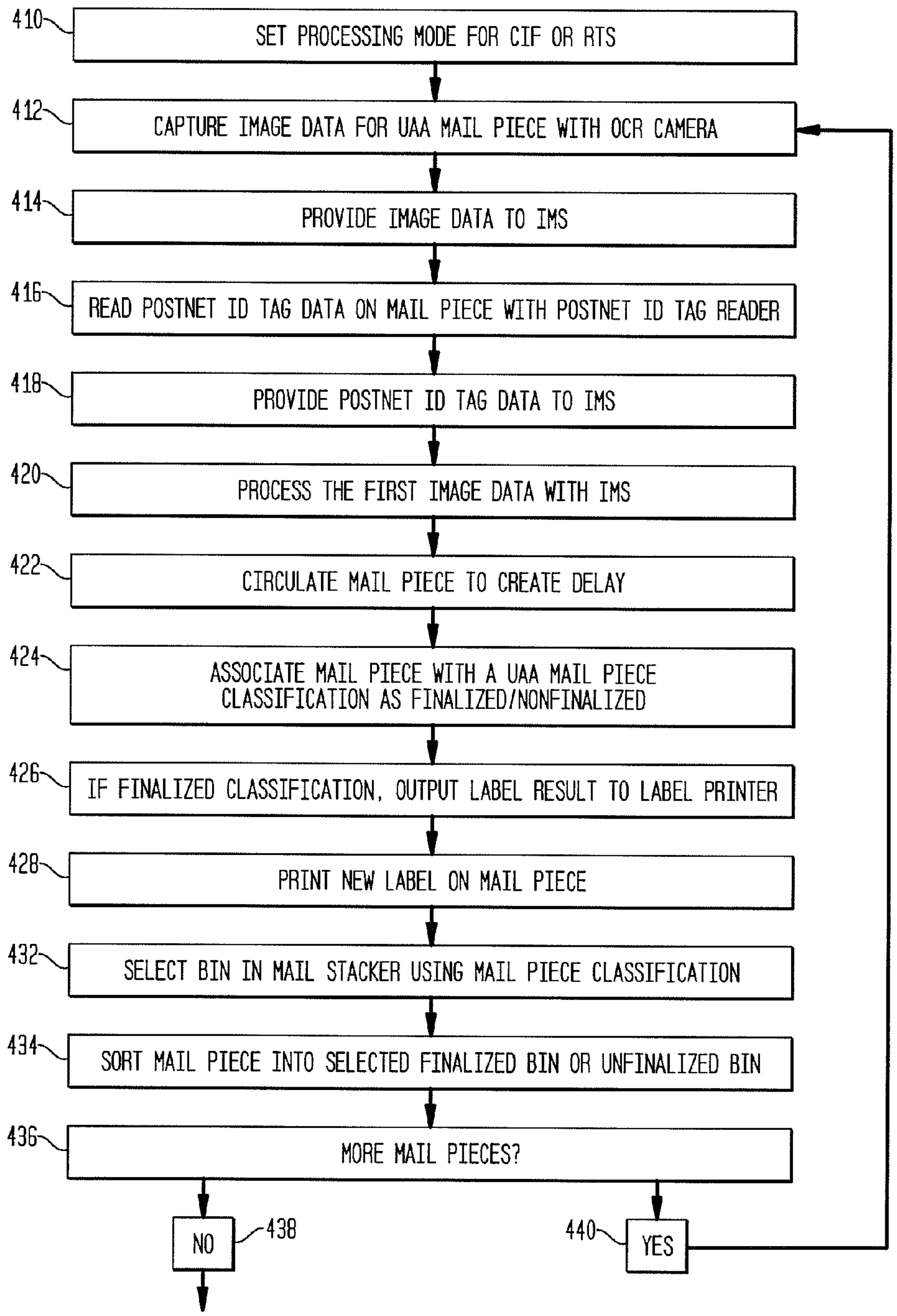
FIG. 4A and 4B depict a method of on-line labeling in accordance with disclosed embodiments.
Figure 4B:
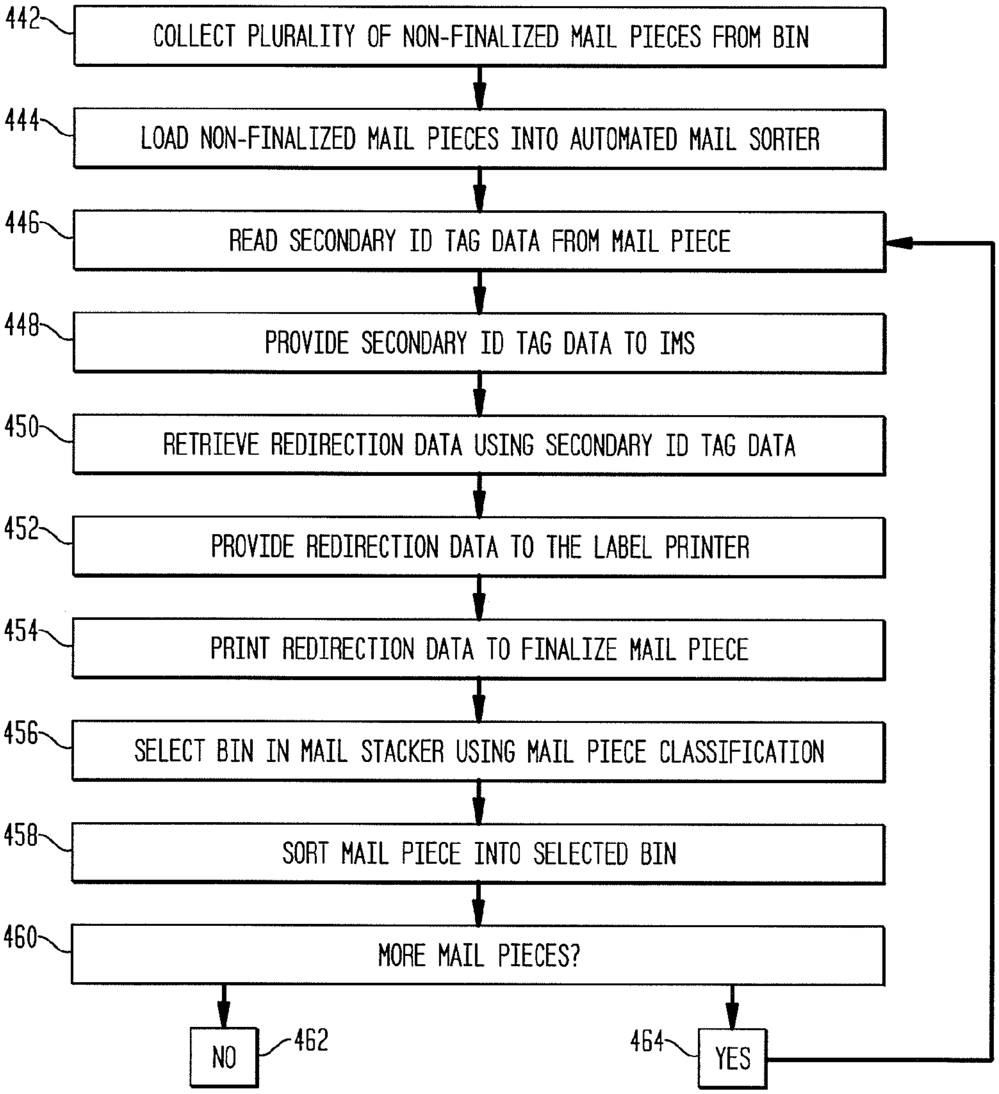

FIGS. 4A and 4B depict a method of on-line labeling in accordance with disclosed embodiments. Referring to FIG. 4A, in order to implement the single run process, a method for automatically sorting UAA mail, can comprise setting a processing mode on an automated mail sorter control interface for at least one of CIF and RTS at 410. At 410, the CIOSS transport 300 described in FIG. 3 can be configured as set out below to automatically implement the method described. In addition to CIF and RTS, other settings can be used, such as settings for INT or intercepted UAA mail pieces.

At 412, the method can include capturing an image of a first UAA mail piece with a camera connected to an automated mail sorter to create first image data. At 414, the method can include providing the first image data to an image management system (IMS) connected to the automated mail sorter, the IMS including a redirection image controller (RIC). At 416, the method can include reading an POSTNET ID-tag on the first UAA mail piece using a POSTNET ID-tag reader connected to the automated mail sorter to obtain first POSTNET ID-tag data. POSTNET is a barcode symbology used by the USPS to encode a series of digits. Alternatively, other readers and symbologies may be used. For example, an Intelligent Mail barcode can be used in place of the POSTNET ID. At 418, the method can include providing the first POSTNET ID-tag data to the IMS. At 420, the method can include processing the first image data with the IMS. At 422, the method can include circulating the UAA mail piece along a circulation path to create a delay.

At 424, the method can include associating with the first UAA mail piece a UAA mail piece classification including at least one of finalized and non-finalized, wherein the UAA mail piece classification finalized includes three finalized subcategories including forwarded to a new address, returned to the sender, and wasted. At 426, the method can include if the first UAA mail piece is associated with a finalized UAA mail piece classification, outputting a first label result to a label printer and at 428, printing a new label on the first UAA mail piece.

At 432, the method can include selecting one of a plurality of bins in a mail stacker using the first UAA mail piece classification. At 434, the method can include sorting the first UAA mail piece into the selected finalized bin or the selected unfinalized bin. At 436, the method can include determining if there are more mail pieces, and if so, at 440 returning to 412 to repeat processing for a plurality of UAA mail pieces. At 438, the method can include determining that there are no additional mail pieces in this run, and so continuing processing at 442, as shown in FIG. 4B.

Referring to FIG. 4B, at 442, the method can include collecting a plurality of non-finalized UAA mail pieces from a bin in the automated mail sorter. At 444, the method can include loading the non-finalized mail pieces into the automated mail sorter.

At 446, the method can include reading the ID-tag from a first piece of non-finalized UAA mail to produce ID-tag data. At 448, the method can include providing the ID-tag data to the IMS. At 450, the method can include retrieving redirection data associated with the ID-tag data, wherein the redirection data associated with the ID-tag can be generated using human assistance. At 452, the method can include providing the redirection data to the label printer. At 454, the method can include printing redirection data on the non-finalized UAA mail to create finalized UAA mail.

At 456, the method can include selecting one of a plurality of bins in a mail stacker using the first UAA mail piece classification. At 458, the method can include sorting the first UAA mail piece into the selected bin. At 460, the method can include determining if there are more mail pieces, and if so, at 464 returning to 446 to repeat processing for a plurality of UAA mail pieces. At 462, the method can include determining that there are no additional mail pieces in this run, and so concluding processing.

Various alternatives can be implemented. For example, in the case of INT UAA mail pieces, for example, a special operational mode may be used wherein the image data is pulled from another automated system which initially intercepted the mail piece and identified it as UAA. An example is the ARTid system, described, for example, in U.S. patent application Ser. No. 13/441,170 to Michael D. Carpenter, incorporated herein by reference. In this case, the image data from ARTid can be fed directly to the IMS, negating the need to perform an initial read with OCR camera 310.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for automatically sorting mail, comprising:

capturing an image of a first undeliverable as addressed (UAA) mail piece with a camera connected to an automated mail sorter to create first image data;

printing an id-tag on the first UAA mail piece;

classifying the first UAA mail piece as one of finalized or non-finalized, wherein classifying as finalized includes classifying the UAA mail piece in a finalized subcategory from a plurality of subcategories, wherein the plurality of subcategories includes a forwarded to a new address subcategory and a returned to the sender subcategory; and if the first UAA mail piece is classified as finalized, outputting a first label result to a label printer and printing a new label on the first UAA mail piece.

2. The method of claim 1, further comprising prior to said classifying the first UAA mail piece:

providing the first image data to an image management system (IMS) connected to the automated mail sorter, the IMS including a redirection image controller (RIC); and processing the first image data with the RIC.

3. The method of claim 2, further comprising:

reading a POSTNET ID-tag on the first UAA mail piece using a POSTNET ID-tag reader connected to the automated mail sorter to obtain first POSTNET ID-tag data; and providing the first POSTNET ID-tag data to the IMS.

4. The method of claim 2, further comprising:

capturing an image of a plurality of UAA mail pieces with a camera connected to an automated mail sorter to create a plurality of first image data;

printing a plurality of ID-tags on the plurality of UAA mail pieces;

providing a plurality of image data to an image management system (IMS) connected to the automated mail sorter, the IMS including a redirection image controller (RIC); and processing the plurality of image data with the RIC;

classifying the plurality of UAA mail pieces as one of finalized or non-finalized;

if the plurality of UAA mail pieces are classified as finalized, outputting a plurality of label results to a label printer and printing a plurality of labels on the plurality of UAA mail pieces;

repeating the steps encompassed by claim 2 for a plurality of UAA mail pieces;

collecting a plurality of UAA mail pieces classified as non-finalized from a bin in the automated mail sorter;

loading the non-finalized UAA mail pieces into the automated mail sorter;

reading the ID-tag from a first piece of non-finalized UAA mail to produce ID-tag data;

providing the ID-tag data to the IMS;

retrieving redirection data associated with the ID-tag data;

providing the redirection data to the label printer;

printing redirection data on the non-finalized UAA mail to create finalized UAA mail.

5. The method of claim 4, wherein the redirection data associated with the ID-tag is generated using human assistance.

6. The method of claim 1, further comprising, prior to the capturing an image of a first UAA mail piece, setting a processing mode on an automated mail sorter control interface for at least one of carrier identified forward (CIF) and return to sender (RTS).

7. The method of claim 1, further comprising, prior to said classifying the first UAA mail piece:

circulating the UAA mail piece along a circulation path to create a delay.

8. The method of claim 1, further comprising:

selecting one of a plurality of bins in a mail stacker using the first UAA mail piece classification;

sorting the first UAA mail piece into the selected bin.

9. The method of claim 1, wherein the plurality of subcategories further includes a wasted subcategory.

10. The method of claim 1, wherein said printing an ID-tag on the first UAA mail piece includes printing a fluorescent barcode on the backside.

11. An automated mail sorter for automatically sorting mail, the automated mail sorter configured to:

capture an image of a first undeliverable as addressed (UAA) mail piece with a camera connected to the automated mail sorter to create first image data;

classify the first UAA mail piece as one of finalized or non-finalized, wherein to classify as finalized includes to classify the UAA mail piece in a finalized subcategory from a plurality of subcategories, wherein the plurality of subcategories includes a forwarded to a new address subcategory and a returned to the sender subcategory; and output a first label result to a label printer and print a new label on the first UAA mail piece if the first UAA mail piece is classified as finalized.

12. The automated mail sorter of claim 11, further configured to:

provide the first image data to an image management system (IMS) connected to the automated mail sorter, the IMS including a redirection image controller (RIC); and process the first image data with the RIC.

13. The automated mail sorter of claim 12, further configured to:

read a POSTNET ID-tag on the first UAA mail piece using a POSTNET ID-tag reader connected to the automated mail sorter to obtain first POSTNET ID-tag data; and provide the first POSTNET ID-tag data to the IMS.

14. The automated mail sorter of claim 11, further configured to:

capture an image of a plurality of UAA mail pieces with a camera connected to the automated mail sorter to create first image data;

provide a plurality of image data to an image management system (IMS) connected to the automated mail sorter, the IMS including a redirection image controller (RIC);

process the plurality of image data with the RIC;

classify the plurality of UAA mail pieces as one of finalized or non-finalized;

output a plurality of label results to a label printer and print a plurality of new labels on the plurality of UAA mail pieces if the plurality of UAA mail pieces are classified as finalized;

collect a plurality of non-finalized UAA mail pieces from a bin in the automated mail sorter;

load the non-finalized UAA mail pieces into the automated mail sorter;

read the ID-tag from a first piece of non-finalized UAA mail to produce ID-tag data;

provide the ID-tag data to the IMS;

retrieve redirection data associated with the ID-tag data;

provide the redirection data to the label printer; and print redirection data on the non-finalized UAA mail to create finalized UAA mail.

15. The automated mail sorter of claim 14, wherein the redirection data associated with the ID-tag is generated using human assistance.

16. The automated mail sorter of claim 11, further configured to set a processing mode on an automated mail sorter control interface for at least one of carrier identified forward (CIF) and return to sender (RTS).

17. The automated mail sorter of claim 11, further configured to:

circulate the UAA mail piece along a circulation path to create a delay.

18. The automated mail sorter of claim 11, further configured to:

select one of a plurality of bins in a mail stacker using the first UAA mail piece classification;

sorting the first UAA mail piece into the selected bin.

19. The automated mail sorter of claim 11, wherein the plurality of subcategories further includes a wasted subcategory.

20. The automated mail sorter of claim 11, configured to print a fluorescent barcode on the backside of the first UAA mail piece.

* * * * *